(12) United States Patent
Jansman et al.

(10) Patent No.: US 10,250,258 B2
(45) Date of Patent: Apr. 2, 2019

(54) DEVICE AND METHOD FOR DETECTING SEMICONDUCTOR SUBSTRATE THICKNESS

(71) Applicant: NXP B.V., Eindhoven (NL)

(72) Inventors: Andreas Bernardus Maria Jansman, Nuenen (NL); Franciscus Petrus Widdershoven, Eindhoven (NL); Viet Thanh Dinh, Leuven (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/279,356

(22) Filed: Sep. 28, 2016

(65) Prior Publication Data

US 2018/0091147 A1    Mar. 29, 2018

(51) Int. Cl.
| | | |
|---|---|---|
| *H03K 19/003* | (2006.01) | |
| *H01L 23/00* | (2006.01) | |
| *H01L 29/861* | (2006.01) | |
| *H01L 27/06* | (2006.01) | |
| *G06F 21/75* | (2013.01) | |
| *H01L 29/06* | (2006.01) | |

(52) U.S. Cl.
CPC ........... *H03K 19/003* (2013.01); *G06F 21/75* (2013.01); *H01L 23/573* (2013.01); *H01L 23/576* (2013.01); *H01L 27/0647* (2013.01); *H01L 29/0649* (2013.01); *H01L 29/861* (2013.01); *H01L 29/8611* (2013.01); *H01L 29/8613* (2013.01)

(58) Field of Classification Search
None
See application file for complete search history.

(56) References Cited

U.S. PATENT DOCUMENTS

| | | | |
|---|---|---|---|
| 5,309,387 A | 5/1994 | Mori | |
| 5,691,648 A | 11/1997 | Cheng | |
| 5,963,781 A * | 10/1999 | Winer | G01B 7/06 |
| | | | 257/E21.53 |
| 6,154,041 A | 11/2000 | Cheng | |
| 6,417,680 B1 * | 7/2002 | Birdsley | G01R 31/311 |
| | | | 324/754.23 |
| 7,420,163 B2 * | 9/2008 | Schueler | G01B 15/02 |
| | | | 250/305 |
| 7,714,596 B2 * | 5/2010 | Chen | G01R 31/2648 |
| | | | 324/715 |
| 8,946,859 B2 | 2/2015 | Lisart et al. | |

(Continued)

OTHER PUBLICATIONS

Xu, Kaikai et al.; "Silicon Avalanche Based Light Emitting Diodes and Their Potential Integration into CMOS and RF Integrated Circuit Technology"; Intech, Chapter 5; 28 pgs.; 2015.

*Primary Examiner* — James H Cho

(57) ABSTRACT

Embodiments of devices and method for detecting semiconductor substrate thickness are disclosed. In an embodiment, an IC device includes a semiconductor substrate, a charge emitter embedded in the semiconductor substrate and configured to produce an electrical charge in the semiconductor substrate and a charge sensor embedded in the semiconductor substrate and configured to generate a response signal in response to the electrical charge produced in the semiconductor substrate. The magnitude of the response signal depends on the thickness of the semiconductor substrate.

19 Claims, 16 Drawing Sheets

(56) References Cited

U.S. PATENT DOCUMENTS

2004/0014240 A1* 1/2004 Takeguchi ............ G01N 27/305
                                                    436/518
2013/0193437 A1   8/2013 Lisart et al.
2013/0200371 A1   8/2013 Marinet et al.
2014/0070829 A1   3/2014 Fornara et al.

* cited by examiner

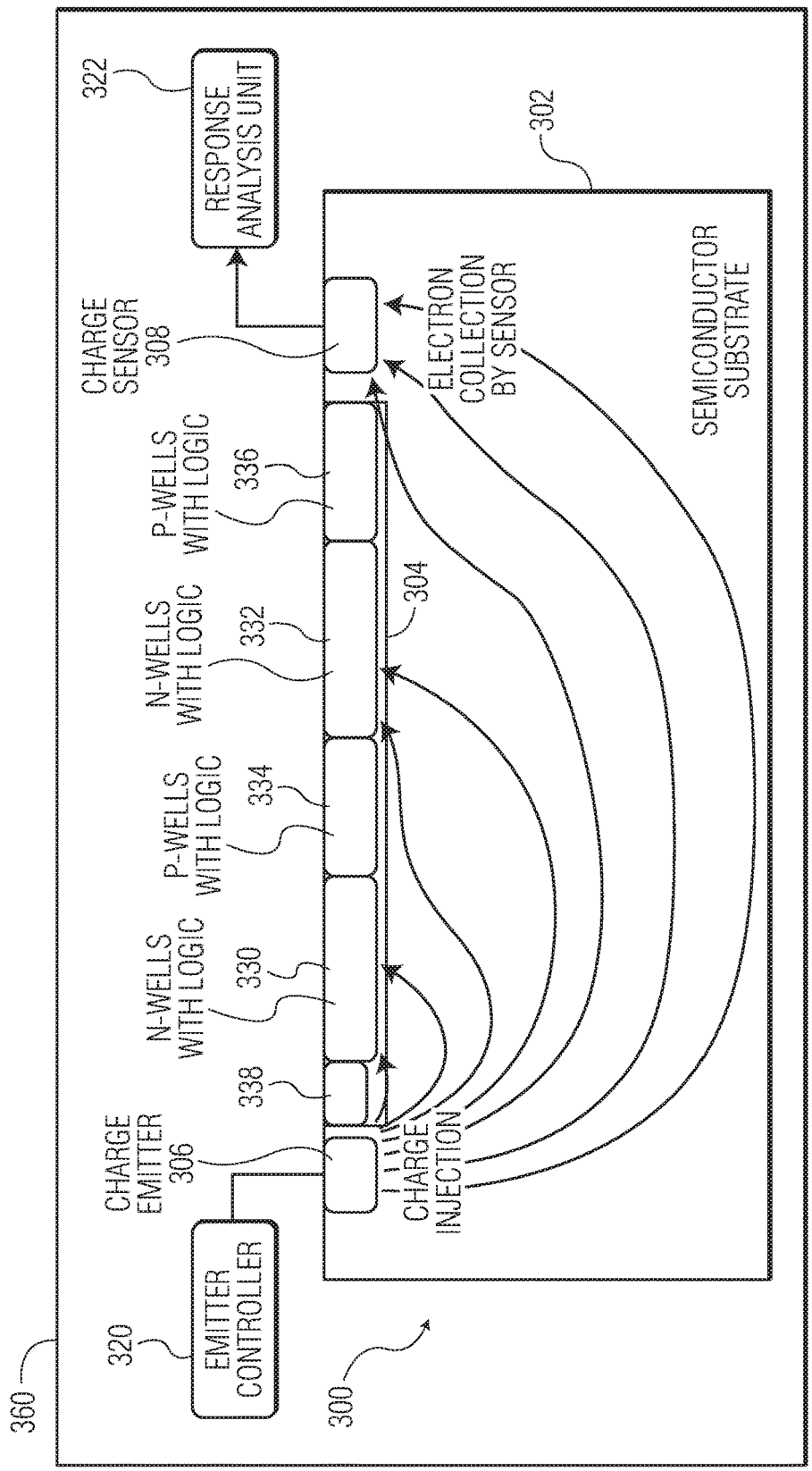

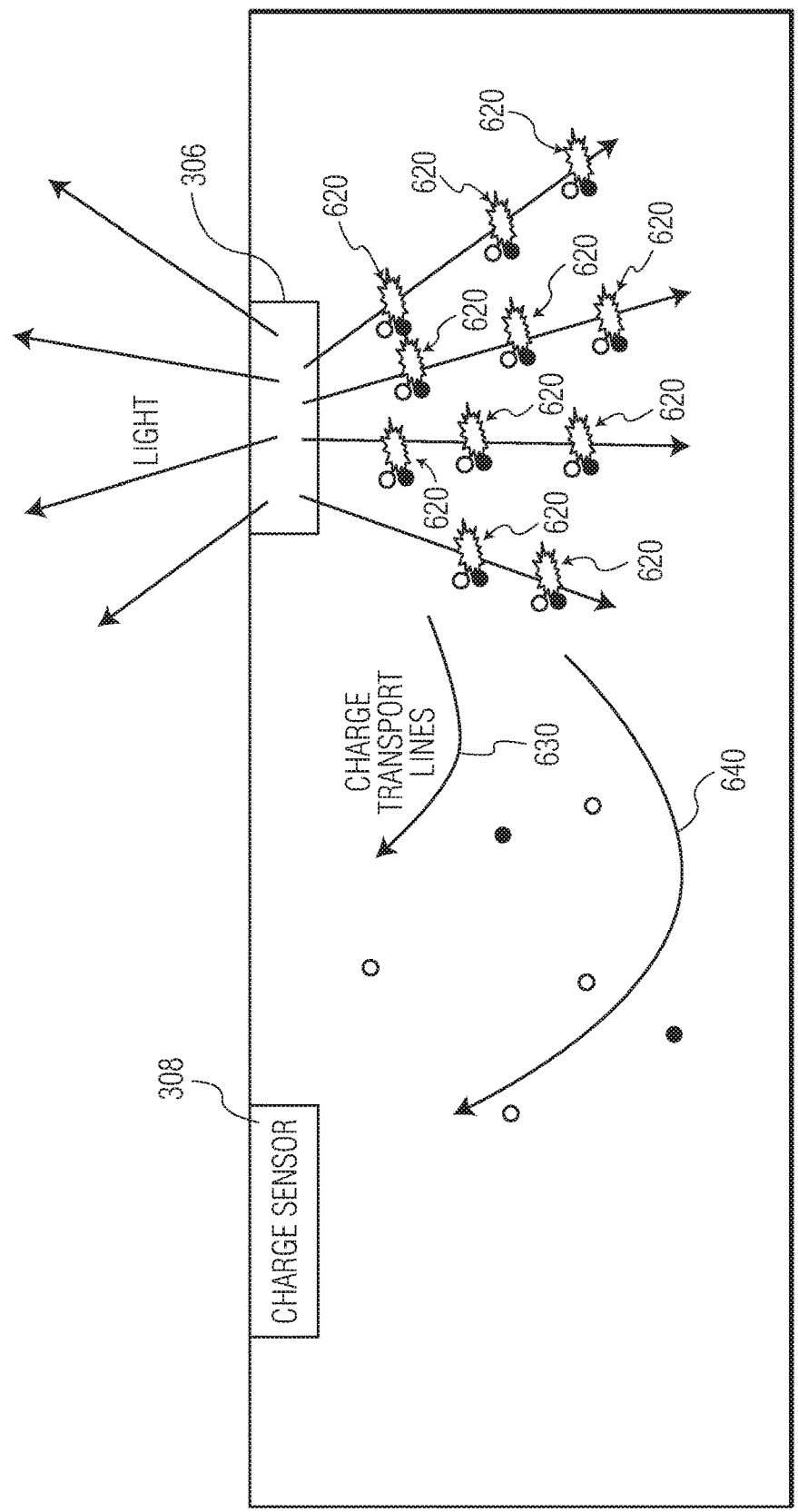

DEVICE AND METHOD FOR DETECTING SEMICONDUCTOR SUBSTRATE THICKNESS

BACKGROUND

Integrated Circuit (IC) chips can be used to store sensitive data and thus may be the target of malicious attacks. For example, an attacker may try to make electrical contact to transistors or metal tracks to read control data or to manipulate an operation on the IC chip. Alternatively, an attacker may try to manipulate an operation by illuminating transistors from the backside with a laser, an attack known as a Laser Fault Injection (LFI) attack. Often, such LFI attacks involve thinning the backside of the IC chip. For example, an attacker may try to remove substrate material from the backside of an IC chip to make electrical contact with the transistor area of the IC chip. In addition, backside thinning makes it easier to launch an LFI attack. Typical security features do not address attacks that involve backside thinning.

SUMMARY

Embodiments of devices and method for detecting semiconductor substrate thickness are disclosed. In an embodiment, an IC device includes a semiconductor substrate, a charge emitter embedded in the semiconductor substrate and configured to produce an electrical charge in the semiconductor substrate and a charge sensor embedded in the semiconductor substrate and configured to generate a response signal in response to the electrical charge produced in the semiconductor substrate. The magnitude of the response signal depends on the thickness of the semiconductor substrate.

In an embodiment, the IC device further includes a response analysis unit configured to generate thickness information of the semiconductor substrate based on the magnitude of the response signal.

In an embodiment, the thickness information of the semiconductor substrate includes information regarding a change in the thickness of the semiconductor substrate.

In an embodiment, the IC device further includes an emitter controller configured to control the magnitude of electrical charge produced by the charge emitter.

In an embodiment, the emitter controller is further configured to control the charge emitter to produce a second electrical charge in the semiconductor substrate having the same magnitude as the electrical charge. The charge sensor generates a second response signal in response to the second electrical charge. The IC device further includes a response analysis unit configured to compare the second response signal to the response signal to determine a change in the thickness of the semiconductor substrate.

In an embodiment, the IC device further includes a second charge emitter embedded in the semiconductor substrate and configured to produce a second electrical charge in the semiconductor substrate.

In an embodiment, the IC device further includes a second charge sensor embedded in the semiconductor substrate and configured to generate a second response signal in response to the second electrical charge produced in the semiconductor substrate. The magnitude of the second response signal depends on the thickness of the semiconductor substrate.

In an embodiment, the charge emitter includes a diode.

In an embodiment, the charge emitter includes a bipolar transistor.

In an embodiment, the charge sensor includes a diode.

In an embodiment, the charge sensor includes a bipolar transistor.

In an embodiment, an IC system includes a semiconductor substrate, a charge emitter embedded in the semiconductor substrate and configured to produce an electrical charge in the semiconductor substrate, an emitter controller configured to control the magnitude of electrical charge produced by the charge emitter, a charge sensor embedded in the semiconductor substrate and configured to generate a response signal in response to the electrical charge produced in the semiconductor substrate, and a response analysis unit configured to generate thickness information of the semiconductor substrate based on the response signal. The magnitude of the response signal depends on the thickness of the semiconductor substrate.

In an embodiment, the emitter controller is further configured to control the charge emitter to produce a second electrical charge in the semiconductor substrate having the same magnitude as the electrical charge. The charge sensor generates a second response signal in response to the second electrical charge. The response analysis unit is configured to compare the second response signal to the response signal to determine a change in the thickness of the semiconductor substrate.

In an embodiment, the IC system further includes a second charge emitter embedded in the semiconductor substrate and configured to produce a second electrical charge in the semiconductor substrate and a second charge sensor embedded in the semiconductor substrate and configured to generate a second response signal in response to the second electrical charge. The magnitude of the second response signal depends on the thickness of the semiconductor substrate.

In an embodiment, the charge emitter includes a diode or a bipolar transistor.

In an embodiment, the charge sensor includes a diode or a bipolar transistor.

In an embodiment, a method for detecting semiconductor substrate thickness involves producing an electrical charge in a semiconductor substrate using a charge emitter embedded in the semiconductor substrate and generating a response signal in response to the electrical charge produced in the semiconductor substrate using a charge sensor embedded in the semiconductor substrate. The magnitude of the response signal depends on the thickness of the semiconductor substrate.

In an embodiment, the method further involves generating thickness information of the semiconductor substrate based on the response signal.

In an embodiment, the thickness information of the semiconductor substrate includes information regarding a change in the thickness of the semiconductor substrate.

In an embodiment, the method further involves producing a second electrical charge in the semiconductor substrate having the same magnitude as the electrical charge and generating a second response signal in response to the second electrical charge. Generating the thickness information of the semiconductor substrate involves comparing the second response signal to the response signal to determine a change in the thickness of the semiconductor substrate.

Other aspects and advantages of embodiments of the present invention will become apparent from the following detailed description taken in conjunction with the accompanying drawings.

BRIEF DESCRIPTION OF THE DRAWINGS

FIG. 3 depicts an embodiment of an IC system with substrate thickness detection capabilities.

FIG. 6 illustrates the generation of charge in the IC system depicted in FIG. 3.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
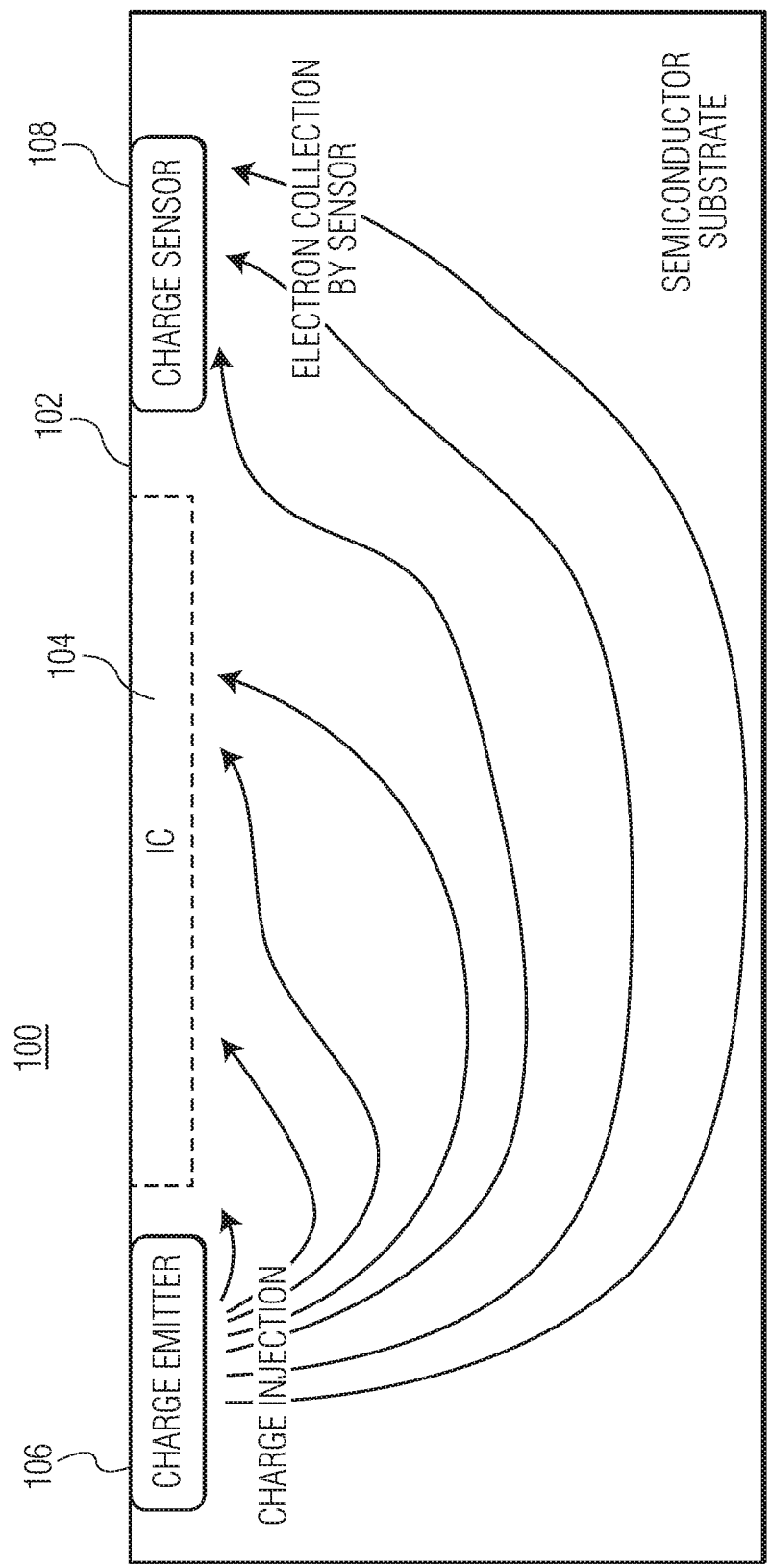
FIG. 1 depicts an IC device with substrate thickness detection capabilities in accordance with an embodiment of the invention.

FIG. 1 depicts an IC device 100 with substrate thickness detection capabilities in accordance with an embodiment of the invention. In the embodiment depicted in FIG. 1, the IC device includes a semiconductor substrate 102, an IC 104, a charge emitter 106, and a charge sensor 108. Although the illustrated IC device is shown with certain components and described with certain functionality herein, other embodiments of the IC device may include fewer or more components to implement the same, less, or more functionality. For example, although the illustrated IC device is shown with one IC, one charge emitter, and one charge sensor, in other embodiments, the IC device may include multiple ICs, multiple charge emitters, and/or multiple charge sensors. In addition to substrate thickness detection capabilities, the IC device may include other data integrity and/or security features.

The semiconductor substrate 102 of the IC device 100 can be implemented as any suitable material. Examples of the materials that can be used for the semiconductor substrate include, without being limited to, silicon and GaAs.

The IC 104, the charge emitter 106, and the charge sensor 108 of the IC device 100 are embedded in the semiconductor substrate 102. In the embodiment depicted in FIG. 1, the IC performs designated functions of the IC device 100. The IC may be a logic circuit, such as a logic circuit residing in p-wells and/or n-wells. Examples of the IC include, without being limited to, memory circuits, microcontrollers, and secure element logic circuits. The charge emitter is configured to produce an electrical charge in the semiconductor substrate. The charge emitter may be a diode, a bipolar transistor, or other suitable electrical charge emission device. In some embodiments, the charge emitter is configured to emit an electrical charge into the semiconductor substrate. In some embodiments, the charge emitter is configured to generate light that is radiated into the semiconductor substrate, which causes an electrical charge to be produced in the semiconductor substrate. The charge sensor is used to collect or capture at least a fraction of the electrical charge or electrons that are injected into the semiconductor substrate by the charge emitter. In the embodiment depicted in FIG. 1, the charge sensor is configured to generate a response signal in response to the electrical charge produced in the semiconductor substrate. The charge sensor may be a diode, a bipolar transistor, or other suitable electrical charge reception device.

The IC 104, the charge emitter 106, and the charge sensor 108 may be embedded in the semiconductor substrate 102 during the manufacturing process. For example, the IC, the charge emitter, and the charge sensor are embedded in the semiconductor substrate through the process used to fabricate the IC device 100. In an embodiment, the IC, the charge emitter, and the charge sensor are fabricated using known semiconductor fabrication techniques, including, for example known Complementary metal-oxide-semiconductor (CMOS) processing techniques. Because the charge emitter and the charge sensor are embedded in the semiconductor substrate, the electrical charge produced by the charge emitter travels through the semiconductor substrate before reaching the charge sensor. The magnitude of electrical charge reaching the charge sensor, and thus the magnitude of the response signal generated by the charge sensor depends on the thickness of the semiconductor substrate. For example, generally a fraction of the electrical charge produced by the charge emitter is collected by the charge sensor. The magnitude of the produced electrical charge collected by the charge sensor depends on geometrical aspects of the IC device, which includes the distance between the charge emitter and the charge sensor, the thickness of the semiconductor substrate, and the size of the charge collector. Thus, the magnitude of the charge collected by the charge sensor can be used as an indicator of substrate thickness and/or changes in substrate thickness.

Figure 2A:
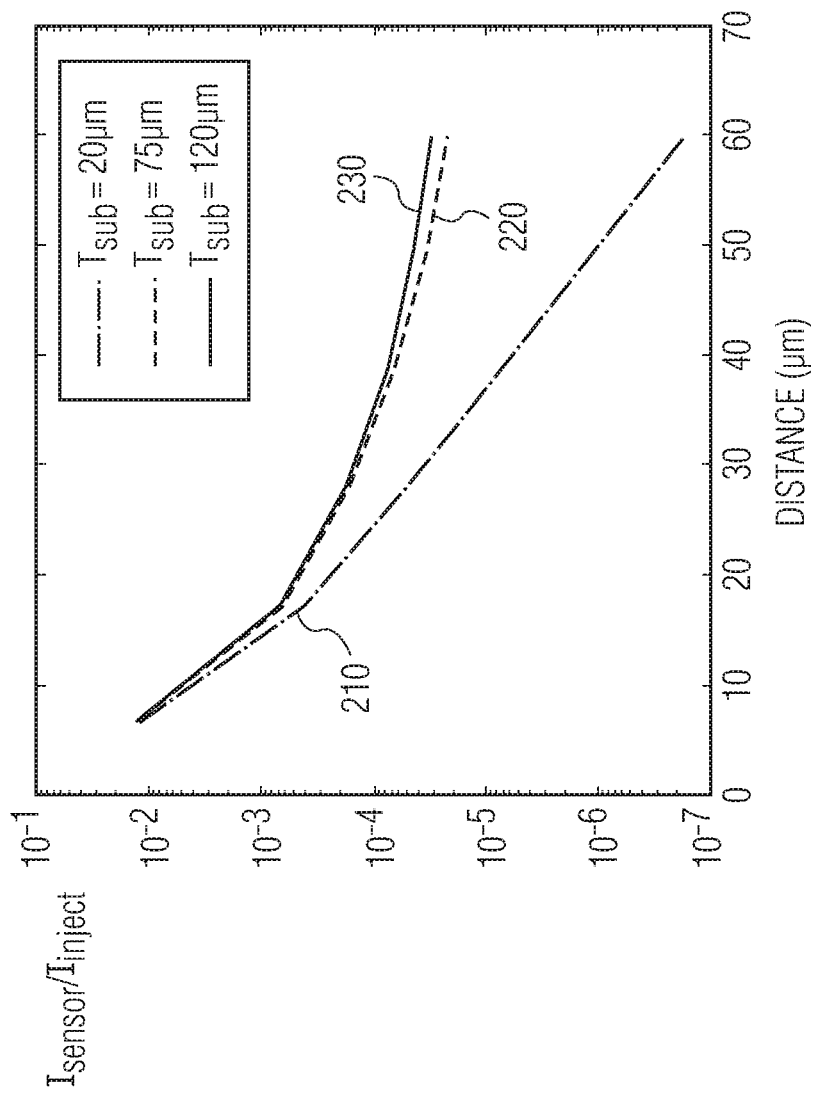
FIG. 2A is a graph of detected charge versus the distance between a charge emitter and a charge sensor of the IC device depicted in FIG. 1 for three different substrate thicknesses.

FIG. 2A is a graph of detected charge versus the distance between the charge emitter 106 and the charge sensor 108 of the IC device 100 depicted in FIG. 1 for three different substrate thicknesses. In the examples, the magnitude of the detected charge is expressed as $I_{sensor}/I_{inject}$. In the plot shown in FIG. 2A, the magnitude of the resulting current ratio decreases as the distance between the charge emitter and the charge sensor increases. The decrease in the magnitude of the current ratio becomes steeper when the semiconductor substrate 102 is thinner. Specifically, the decrease in the magnitude of the current ratio in the curve 210, in which the substrate thickness is equal to 20 um is steeper than the decrease in the magnitude of the current ratio in the curve 220, in which the substrate thickness is equal to 75 um. In addition, the decrease in the magnitude of the current ratio in the curve in which the substrate thickness is equal to 75 um is steeper than the decrease in the magnitude of the current ratio in the curve 230, in which the substrate thickness is equal to 120 um. The curve in which the substrate thickness is equal to 20 um starts deviating from the original direction of the curve after the distance between the charge emitter and the charge sensor becomes larger than the substrate thickness.

Figure 2B:
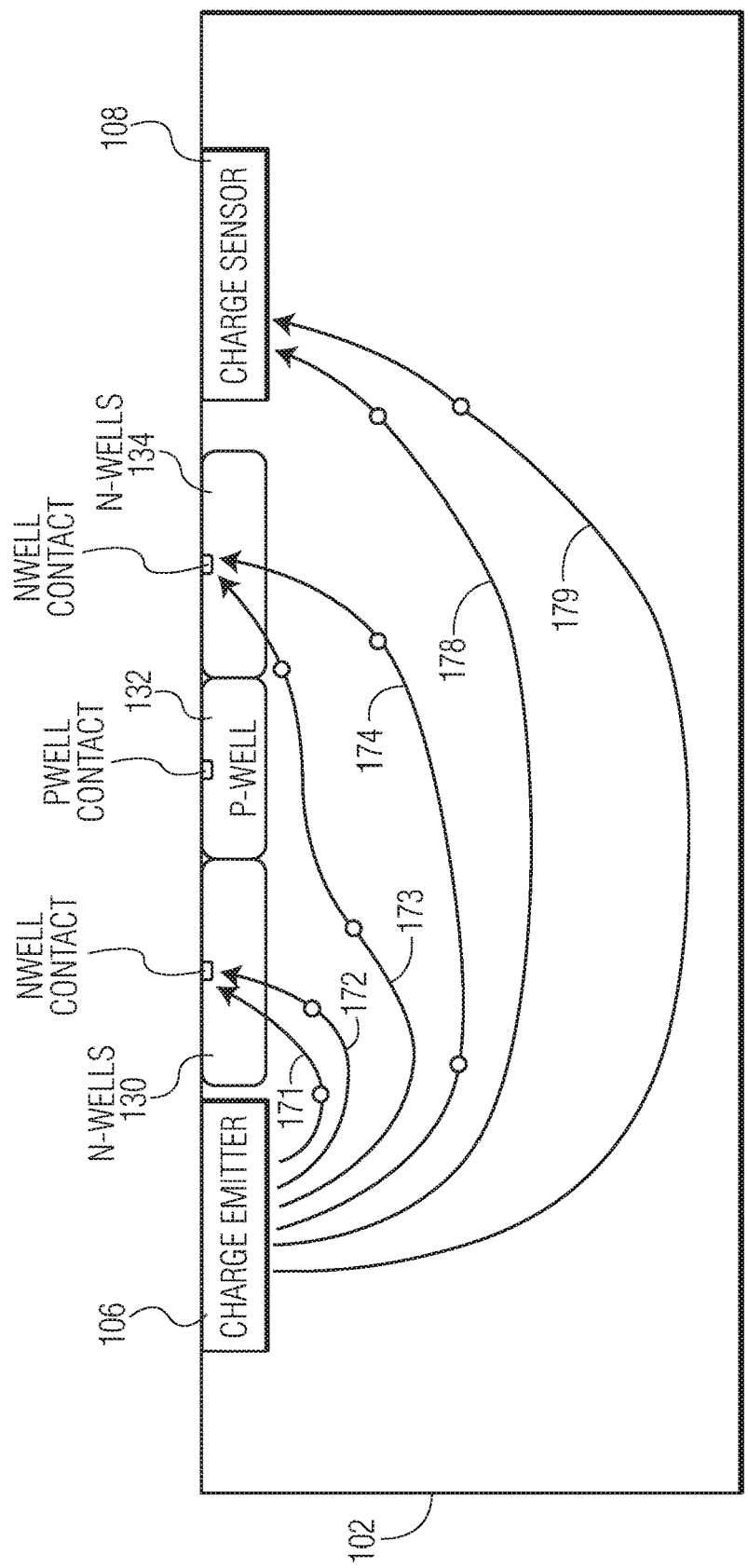
FIG. 2B illustrates charge injection by the charge emitter of the IC device depicted in FIG. 1 and electron collection by the charge sensor of the IC device depicted in FIG. 1.

FIG. 2B illustrates charge injection by the charge emitter 106 and electron collection by the charge sensor 108 given a particular semiconductor substrate thickness. As depicted in FIG. 2B, doped wells 130, 132, 134 of the IC 104 (depicted in FIG. 1), which include electrical contacts, are located between the charge emitter and the charge sensor. Generally, N-wells can collect electrons while p-wells collect holes. The electrons emitted from the charge can be divided into a group, Qs, of electrons, which flow close to the surface of the semiconductor substrate (as represented by lines 171, 172, 173, 174), and a group, Qd, of electrons, which follow trajectories (as represented by lines 178, 179) deep into the semiconductor substrate. The charge, Qsensor, arriving at the charge sensor can be represented as:

$$Qsensor = Fs \cdot Qs + Fd \cdot Qd$$

where Fs and Fd represent the fractions of electrons arriving at the charge sensor. Thinning the semiconductor substrate may significantly affect the fraction, Fd, of electrons, Qd, following trajectories deep into the semiconductor substrate, but tends not to significantly affect the fraction, Fs, of electrons, Qs, flowing close to the surface of the semiconductor substrate. To detect substrate thinning, the sensor signal is compared with a reference value measured with the original substrate thickness. Because the fraction value, Fs, is less thickness-dependent, the term Fs·Qs is effectively an offset term, which adds noise to the comparison between the sensor signal and the reference value. To increase signal-to-noise, the fraction value, Fs, should be kept low. As shown in FIG. 2B, electrons following a trajectory close to the substrate surface have a good chance of being captured by the n-wells. Consequently, the fraction, Fs, of surface electrons reaching the charge sensor is low. Therefore, doped regions between the charge emitter and the charge sensor can improve the signal-to-noise ratio for detection of substrate thinning.

The IC device 100 depicted in FIG. 1 uses the charge emitter 106 and the charge sensor 108 that are embedded in the IC device to detect the thickness of the semiconductor substrate 102. Consequently, the IC device depicted in FIG. 1 does not need external emission and sensor devices to detect the thickness of the semiconductor substrate. Such an embedded detection technique is desirable, because the IC device may be the sole hardware component that supports an application. Based on the detection of thickness change, the IC device depicted in FIG. 1 can be configured to perform security actions and/or trigger security actions to thwart an attack on data or data operations (e.g., the IC device may re-compute or reversely compute, go into a safe mode, or switch itself off permanently). Consequently, compared to an IC device that measures substrate thickness by applying beams of light to a substrate of an IC device using an external light source, the IC device depicted in FIG. 1 can have reduced silicon area overhead, improved computation time, and reduced power consumption.

In some embodiments, the IC device 100 depicted in FIG. 1 further includes a second charge emitter embedded in the semiconductor substrate 102 and configured to produce a second electrical charge in the semiconductor substrate. The IC device may also include a second charge sensor embedded in the semiconductor substrate and configured to generate a second response signal in response to the second electrical charge produced in the semiconductor substrate. The magnitude of the second response signal also depends on the thickness of the semiconductor substrate. By using more than one charge emitter and more than one corresponding charge sensor, the IC device can improve the accuracy of detecting substrate thickness. For example, multiple charge emitter/change sensor pairs may be used to detect thinning over a larger substrate area.

FIG. 3 depicts an embodiment of an IC system 360 with substrate thickness detection capabilities. In the embodiment depicted in FIG. 3, the IC system includes an IC device 300, an emitter controller 320, and a response analysis unit 322. The IC device includes a semiconductor substrate 302, an IC 304, a charge emitter 306, and a charge sensor 308. The emitter controller can be used to control the portion of charge that is produced in the substrate by the charge emitter. The response analysis unit can be used to analyze the signal generated by the charge sensor and to decide whether the substrate has been thinned. The emitter controller and the response analysis unit may be external to the IC device (e.g., not fabricated on the same substrate as the charge emitter and the charge sensor of the IC device) or embedded within the IC device (e.g., fabricated on the same substrate as the charge emitter and the charge sensor of the IC device). In some embodiments, the IC, the charge emitter, the charge sensor, the emitter controller, and the response analysis unit are embedded in the semiconductor substrate during the fabrication process. For example, the IC, the charge emitter, and the charge sensor are embedded in the semiconductor substrate through the process used to fabricate the IC device. In an embodiment, the IC, the charge emitter, and the charge sensor are fabricated using known semiconductor fabrication techniques, including, for example known CMOS processing techniques. The IC device 300 depicted in FIG. 3 is one possible embodiment of the IC device 100 depicted in FIG. 1. Specifically, the semiconductor substrate 302, the IC 304, the charge emitter 306, and the charge sensor 308 depicted in FIG. 3 are embodiments of the semiconductor substrate 102, the IC 104, the charge emitter 106, and the charge sensor 108 depicted in FIG. 1. However, the IC device 100 depicted in FIG. 1 is not limited to the embodiment shown in FIG. 3. For example, in the embodiment depicted in FIG. 3, the IC 304 includes two logic circuits 330, 332 located in N-wells, two logic circuits 334, 336 located in P-wells, and an electrical isolation element 338, which may be an electrical insulator made of a dielectric material such as silicon oxide. However, although the IC device 300 is depicted in FIG. 3 as including multiple n-wells and p-wells, in other embodiments, the IC device includes a single n-well and/or a single p-well.

In some embodiments, the emitter controller 320 is configured to control the charge emitter 306 to produce a second electrical charge in the semiconductor substrate 302. The charge sensor generates a second response signal in response to the second electrical charge. The response analysis unit 322 is configured to compare the second response signal to the previously generated response signal to determine a change in the thickness of the semiconductor substrate. In an embodiment, the second charge has the same magnitude as the previously produced electrical charge in order to detect substrate thickness change (e.g., caused by backside thinning).

The emitter controller 320 is configured to control the electrical charge that the charge emitter 306 produces in the semiconductor substrate 302. The emitter controller can be implemented in hardware (e.g., as one or more logic circuits), software, firmware, or a combination thereof. In some embodiments, the emitter controller controls the charge emitter to periodically inject electrical charge, which can be more power-efficient than a charge emitter that constantly injects electrical charge. In an embodiment, the emitter controller includes a transistor that makes/breaks the connection to a bias voltage. In another embodiment, the emitter controller includes a current controller or voltage controller for controlling the charge emitter to inject various amounts of charge into the semiconductor substrate.

The response analysis unit 322 is configured to generate thickness information of the semiconductor substrate 302 based on the response signal from the charge sensor 308. The response analysis unit can be implemented in hardware (e.g., as one or more logic circuits), software, firmware, or a combination thereof. In some embodiments, the response analysis unit detects whether the semiconductor substrate has been thinned based on the response signal from the charge sensor. In an embodiment, the sensor output for the nominal substrate thickness is known by the response analysis unit. Upon injection of charge into the substrate and charge detection at the charge sensor, the sensor output is compared to the known sensor output for nominal thickness and a change in substrate thickness can be detected from the comparison result. For example, if the magnitude of the sensor output is smaller than the magnitude of the known sensor output, it can be determined that the thickness of the semiconductor substrate has been reduced. If the magnitude of the sensor output is the same as the magnitude of the known sensor output (e.g., within an accepted range of, for example, ±5%), it can be determined that there has been no change in the thickness of the semiconductor substrate. In an embodiment, the known sensor output for nominal thickness is stored as an entry in a lookup table and the sensor output is compared to the entry in the lookup table. In some embodiments, time-coding or modulation is performed on the response signal to improve the signal-to-noise ratio.

In some embodiments, the IC device 300 includes multiple charge emitters 306. The IC device can switch on all of the charge emitters simultaneously to increase the electrical charge gathered by the charge sensor 308. An increased output signal from the charge sensor can make signal interpretation easier. In an alternative embodiment, individual charge emitters or groups of charge emitters may be driven consecutively. The difference in response signals between the individual emitters or groups of charge emitters or the ratio of response signals to the individual emitters or groups of charge emitters can be used to extract more precise information about substrate thickness and/or to extract information without reference to a known sensor output for a nominal thickness.

In some embodiments, the IC device 300 includes only one charge emitter 306 and multiple charge sensors 308. In some other embodiments, the IC device 300 includes multiple charge emitters and multiple charge sensors for monitoring the thickness of a large area of a substrate. Charge emitter and charge sensor pairs can be used to monitor the substrate thickness of particular areas within a large substrate area. The difference in response signals between the individual pairs of charge emitters and charge sensors or the ratio of response signals to the individual pairs of charge emitters and charge sensors can be used to extract information about substrate thickness or to extract information without reference to a known sensor output for a nominal thickness. For example, a first charge emitter and charge sensor pair may be embedded in a first section of a particular substrate area and a second charge emitter and charge sensor pair may be embedded in a second section of the particular substrate area. The first charge emitter and charge sensor pair can be used to extract substrate thickness information related to the first section while the second charge emitter and charge sensor pair can be used to extract substrate thickness information related to the second section. In another embodiment, more than two charge emitter/sensor pairs can be distributed laterally across the area of an IC device to provide substrate thinning detection over a wide area of the IC device.

Figure 4A:
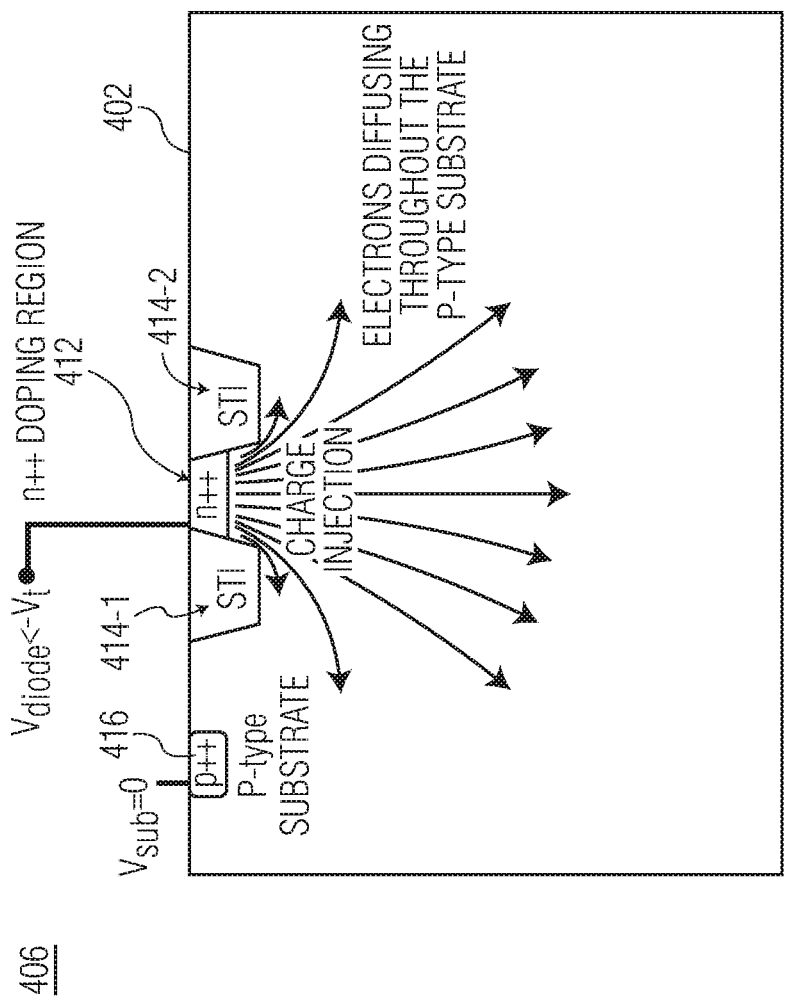
FIGS. 4A and 4B depict two embodiments of a charge emitter of the IC system depicted in FIG. 3 that are implemented as diodes with a p-type substrate.
Figure 4B:
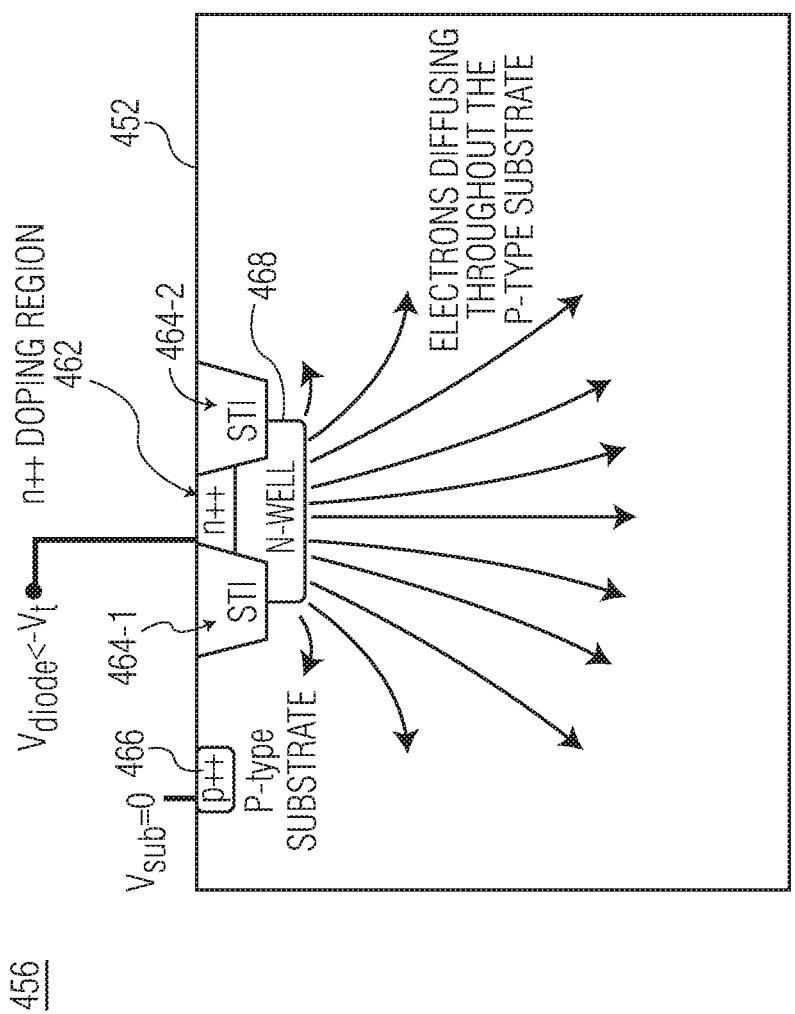

FIGS. 4A and 4B depict two embodiments of the charge emitter 306 depicted in FIG. 3 that are implemented as diodes with a p-type substrate. Charge emitters 406 and 456 depicted in FIGS. 4A and 4B, respectively, are two possible embodiments of the charge emitter 306 depicted in FIG. 1. However, the charge emitter 306 depicted in FIG. 3 is not limited to the embodiments shown in FIGS. 4A and 4B.

FIG. 4A depicts an embodiment of the charge emitter 306 depicted in FIG. 3 that is implemented as a diode realized by an n++ doped region 412. In the embodiment depicted in FIG. 4A, the semiconductor substrate 402 of the charge emitter 406 is a p-type substrate. The charge emitter 406 is realized by a PN-junction diode, formed by the n++ doped region, two shallow trench isolation (STI) units 414-1, 414-2, and the p-type substrate. When the negative bias voltage (diode voltage Vdiode<−Vt threshold voltage) is applied to the n++ doped region and the p-type substrate is grounded (the substrate voltage Vsub=0) through a P++ contact region 416, the PN-junction diode is brought into a forward state and electrons are injected into the p-type substrate. The n++ doped region can be produced in the same process step as source and drain pads of p-channel metal-oxide semiconductor (PMOS) transistors.

FIG. 4B depicts an embodiment of the charge emitter 306 depicted in FIG. 3 that is implemented as a diode realized by an n-well region 468, which is contacted by an n++ doped region 462. In the embodiment depicted in FIG. 4B, the semiconductor substrate 452 is a p-type substrate. The charge emitter 456 is realized by a PN-junction diode, formed by the ++ doped region, two STI units 464-1, 464-2, the n-well region, and the p-type substrate. When the negative bias voltage (diode voltage Vdiode<−Vt threshold voltage) is applied to the n++ doped region and the n-well region and the p-type substrate is grounded (the substrate voltage Vsub=0) through a P++ contact region 466, the PN-junction diode is brought into a forward state and electrons are injected into the p-type substrate.

Figure 5A:
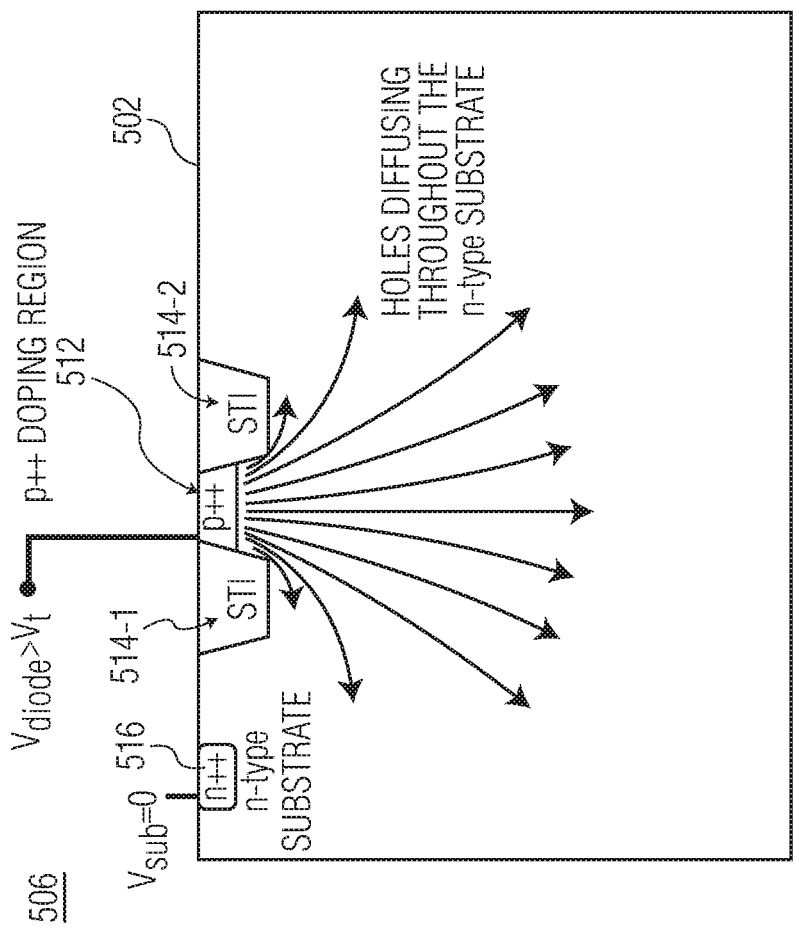
FIGS. 5A and 5B depict two embodiments of the charge emitter of the IC system depicted in FIG. 3 that are implemented as on-chip light-emitting diodes (LEDs) with an n-type substrate.
Figure 5B:
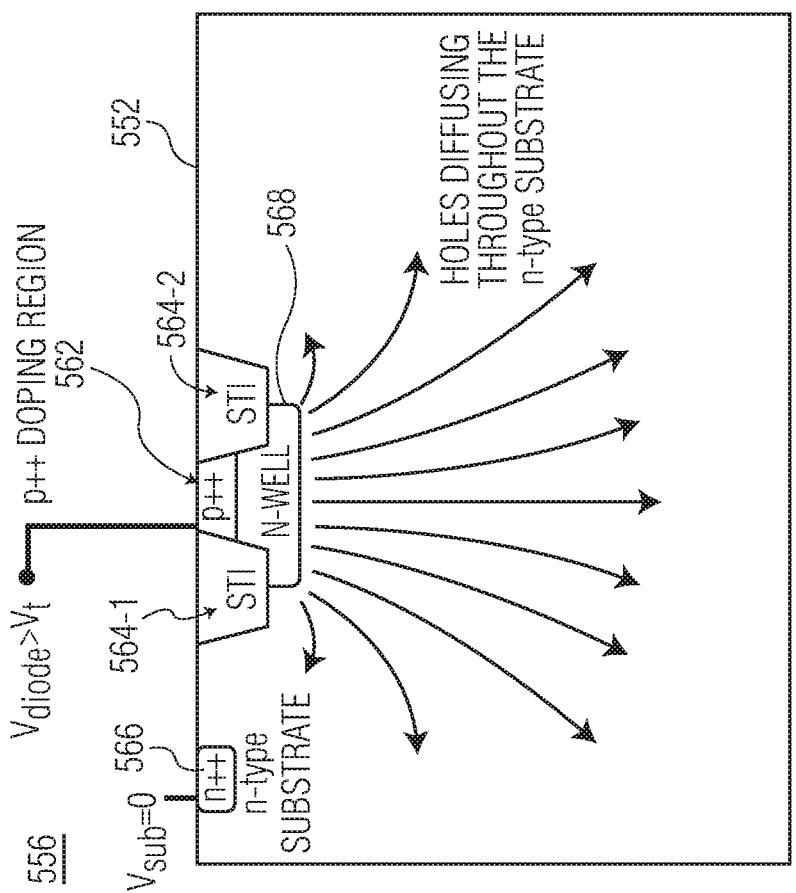

FIGS. 5A and 5B depict two embodiments of the charge emitter 306 depicted in FIG. 3 that are implemented as on-chip light-emitting diodes (LEDs) with an n-type substrate. Charge emitters 506 and 556 depicted in FIGS. 5A and 5B, respectively, are two possible embodiments of the charge emitter 306 depicted in FIG. 1. However, the charge emitter 306 depicted in FIG. 3 is not limited to the embodiments shown in FIGS. 5A and 5B.

FIG. 5A depicts an embodiment of the charge emitter 306 depicted in FIG. 3 that is implemented as a p++ doped region 512. In the embodiment depicted in FIG. 5A, the semiconductor substrate 502 is an n-type substrate. The charge emitter 506 is realized by a PN-junction diode, formed by the p++ doped region, two STI units 514-1, 514-2, and the n-type substrate. When the positive bias voltage (diode voltage Vdiode>Vt threshold voltage) is applied to the p++ doped region and the n-type substrate is grounded (the substrate voltage Vsub=0) through an n++ contact region 516, the charge emitter is brought into a forward state and holes are injected into the n-type substrate.

FIG. 5B depicts an embodiment of the charge emitter 306 depicted in FIG. 3 that is realized by a p-well region 568, which is contacted by a p++ doped region 562. In the embodiment depicted in FIG. 5B, the semiconductor substrate 552 is an n-type substrate. The charge emitter is realized by a PN-junction diode, formed by the p++ doped region, two STI units 564-1, 564-2, the p-well region, and the n-type substrate. When the positive bias voltage (diode voltage Vdiode>Vt threshold voltage) is applied to the p++ doped region and the n-type substrate is grounded (the substrate voltage Vsub=0) through an n++ contact region 566, the charge emitter is brought into a forward state and electrons are injected into the n-type substrate.

FIG. 6 illustrates the generation of charge in the IC system 360 depicted in FIG. 3. In the operation illustrated in FIG. 6, the charge emitter 306 does not directly emit charge. Rather, the charge emitter is activated to generate light. Some of the light generated by the LED is radiated upwards. However, a portion of the light generated by the LED is radiated into the n-type substrate, as illustrated in FIG. 6. In the n-type substrate, the light photons can produce electron-hole pairs 620, e.g., in the vicinity of the light-emitting diode. These electrons or holes diffuse throughout the substrate as illustrated by charge transport lines 630, 640 and a fraction of electrons or holes will be collected by the charge sensor 308. The fraction of electrons collected by the charge sensor is thickness-dependent. In the embodiment depicted in FIG. 6, the charge creation is also thickness-dependent. For example, light from the LED can produce electron-hole pairs when traveling through the substrate. But for thinned silicon, the light will travel through the substrate over a shorter distance, so less charge will be detected in the charge sensor.

Figure 7A:
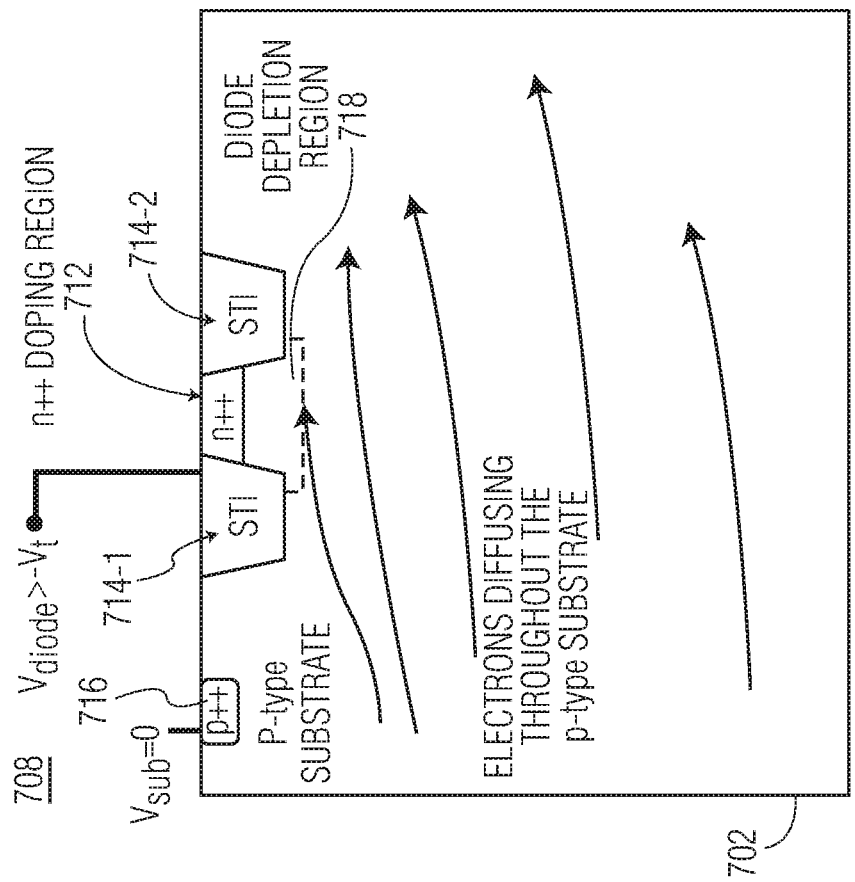
FIGS. 7A and 7B depict two embodiments of a charge sensor of the IC system depicted in FIG. 3 that are implemented as diodes with a p-type substrate.
Figure 7B:
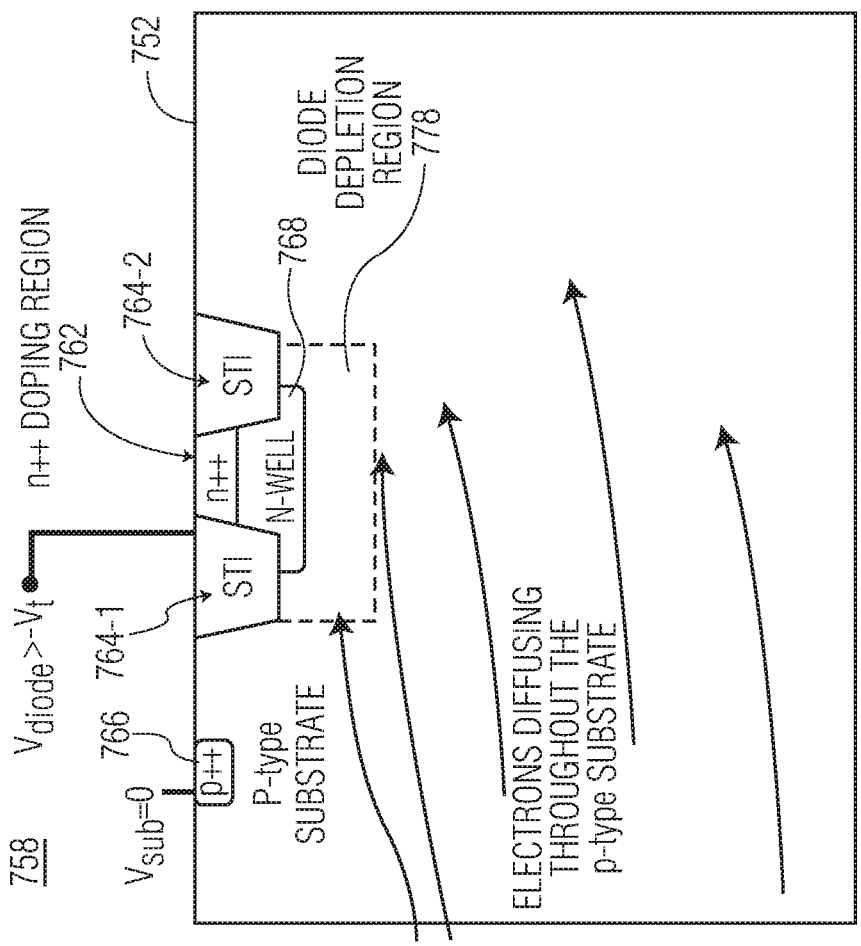

FIGS. 7A and 7B depict two embodiments of the charge sensor 308 depicted in FIG. 3 that are implemented as diodes with a p-type substrate. Charge sensors 708 and 758 depicted in FIGS. 7A and 7B, respectively, are two possible embodiments of the charge sensor 308 depicted in FIG. 1. However, the charge sensor 308 depicted in FIG. 3 is not limited to the embodiments shown in FIGS. 7A and 7B.

FIG. 7A depicts an embodiment of the charge sensor 308 depicted in FIG. 3 that is implemented as a diode realized by an n++ doped region 712. In the embodiment depicted in FIG. 7A, the semiconductor substrate 702 is a p-type substrate. The charge sensor 708 is realized by a PN-junction diode, formed by the n++ doped region, two STI units 714-1, 714-2, and the p-type substrate. When a positive bias voltage (diode voltage Vdiode>−Vt threshold voltage) is applied to the n++ doped region and the p-type substrate is grounded (the substrate voltage Vsub=0) through a P++ contact region 716, the PN-junction diode is brought into a backward state and electrons can be collected at a diode depletion region 718 through the p-type substrate. The n++ doped region can be produced in the same process step as the source and drain pads of PMOS transistors.

FIG. 7B depicts an embodiment of the charge sensor 308 depicted in FIG. 3 that is implemented as a diode realized by an n-well region 768, which is contacted by an n++ doped region 762. In the embodiment depicted in FIG. 7B, the semiconductor substrate 752 is a p-type substrate. The charge sensor 758 is realized by a PN-junction diode, formed by the n++ doped region, the n-well region, two STI units 764-1, 764-2, and the p-type substrate. When a positive bias voltage (diode voltage Vdiode>−Vt threshold voltage) is applied to the n++ doped region and the n-well region and the p-type substrate is grounded (the substrate voltage Vsub=0) through a P++ contact region 766, the PN-junction diode is brought into a backward state and electrons can be collected at a diode depletion region 778 through the p-type substrate.

Figure 8A:
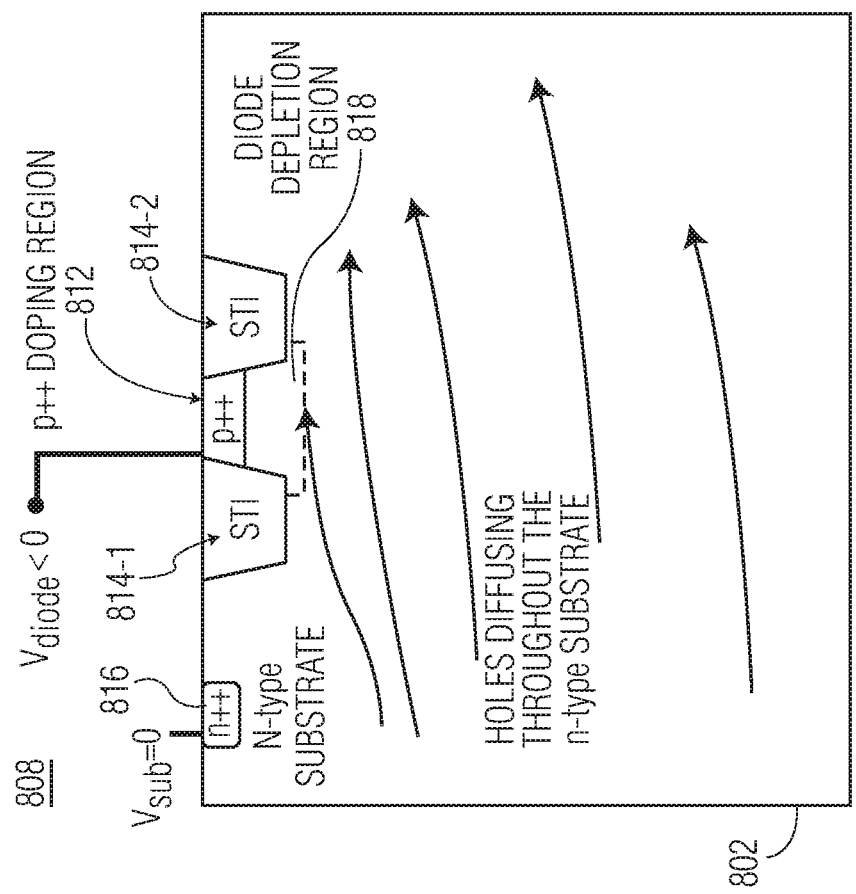
FIGS. 8A and 8B depict two embodiments of the charge sensor of the IC system depicted in FIG. 3 that are implemented as diodes with an n-type substrate.
Figure 8B:
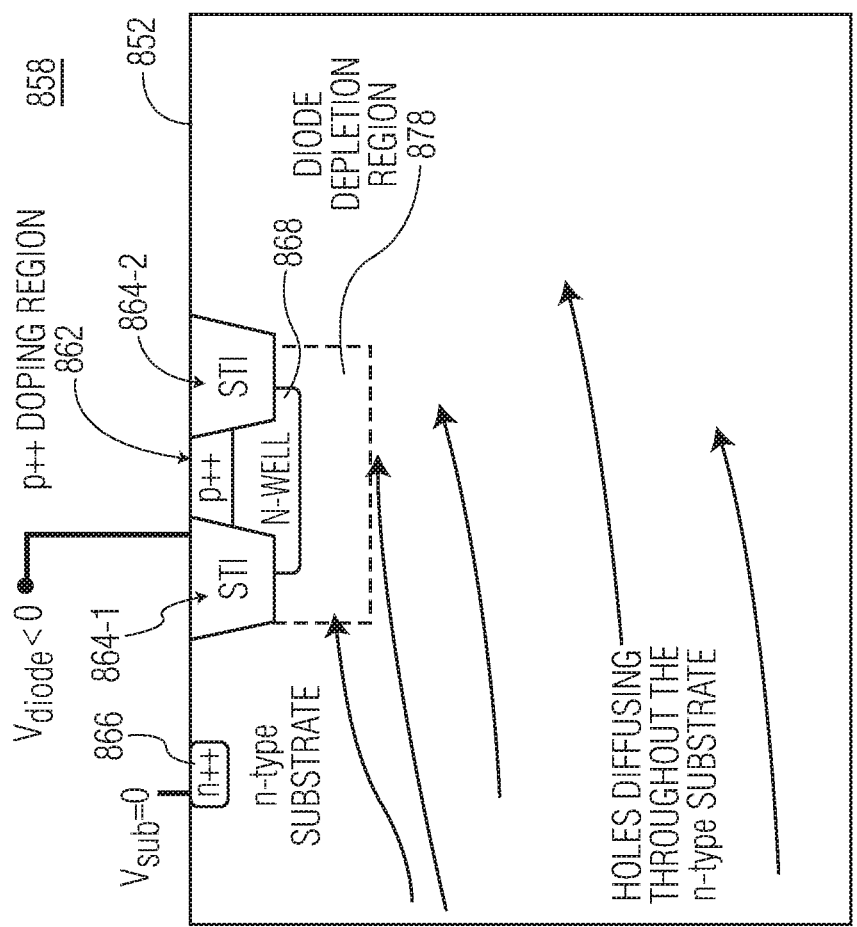

FIGS. 8A and 8B depict two embodiments of the charge sensor 308 depicted in FIG. 3 that are implemented as diodes with an n-type substrate. Charge sensors 808 and 858 depicted in FIGS. 8A and 8B, respectively, are two possible embodiments of the charge sensor 308 depicted in FIG. 1. However, the charge sensor 308 depicted in FIG. 3 is not limited to the embodiments shown in FIGS. 8A and 8B.

FIG. 8A depicts an embodiment of the charge sensor 308 depicted in FIG. 3 that is implemented as a diode realized by a p++ doped region 812. In the embodiment depicted in FIG. 8A, the semiconductor substrate 802 is an n-type substrate. The charge sensor 808 is realized by a PN-junction diode, formed by the p++ doped region, two STI units 814-1, 814-2, and the n-type substrate. When the negative bias voltage (diode voltage Vdiode<0) is applied to the p++ doped region and the p-type substrate is grounded (the substrate voltage Vsub=0) through a P++ contact region 816, the PN-junction diode is brought into a backward state and electrons can be collected at a diode depletion region 818 through the n-type substrate. The p-type pad can be produced in the same process step as source and drain pads of PMOS transistors.

FIG. 8B depicts an embodiment of the charge sensor 308 depicted in FIG. 3 that is implemented as a diode realized by a p-well region 868, which is contacted by a p++ doped region 862. In the embodiment depicted in FIG. 8B, the semiconductor substrate 852 is an n-type substrate. The charge sensor 858 is realized by a PN-junction diode, formed by the p++ doped region, the p-well region, two STI units 864-1, 864-2, and the n-type substrate. When the negative bias voltage (diode voltage Vdiode<0) is applied to the p++ doped region and the n-well region and the p-type substrate is grounded (the substrate voltage Vsub=0) through a P++ contact region 866, the PN-junction diode is brought into a backward state and electrons can be collected at a diode depletion region 878 through the n-type substrate.

The charge sensors 708 and 758 depicted in FIGS. 7A and 7B, respectively, are sensitive to electrons injected into the semiconductor substrate. Those electrons that diffuse to the neighborhood of the charge sensors (e.g., more precisely to the depletion regions of the charge sensors) experience a diode potential, which pulls the electrons into the corresponding n++ doped region. These electrons contribute to the sensor output current.

The charge sensors 808 and 858 depicted in FIGS. 8A and 8B, respectively, are sensitive to holes injected into the semiconductor substrate. Those holes that diffuse to the neighborhood of the charge sensors (e.g., more precisely to the depletion regions of the charge sensors) experience a diode potential, which pulls the holes into the corresponding p++ doped region. These holes contribute to the sensor output current.

Figure 9:
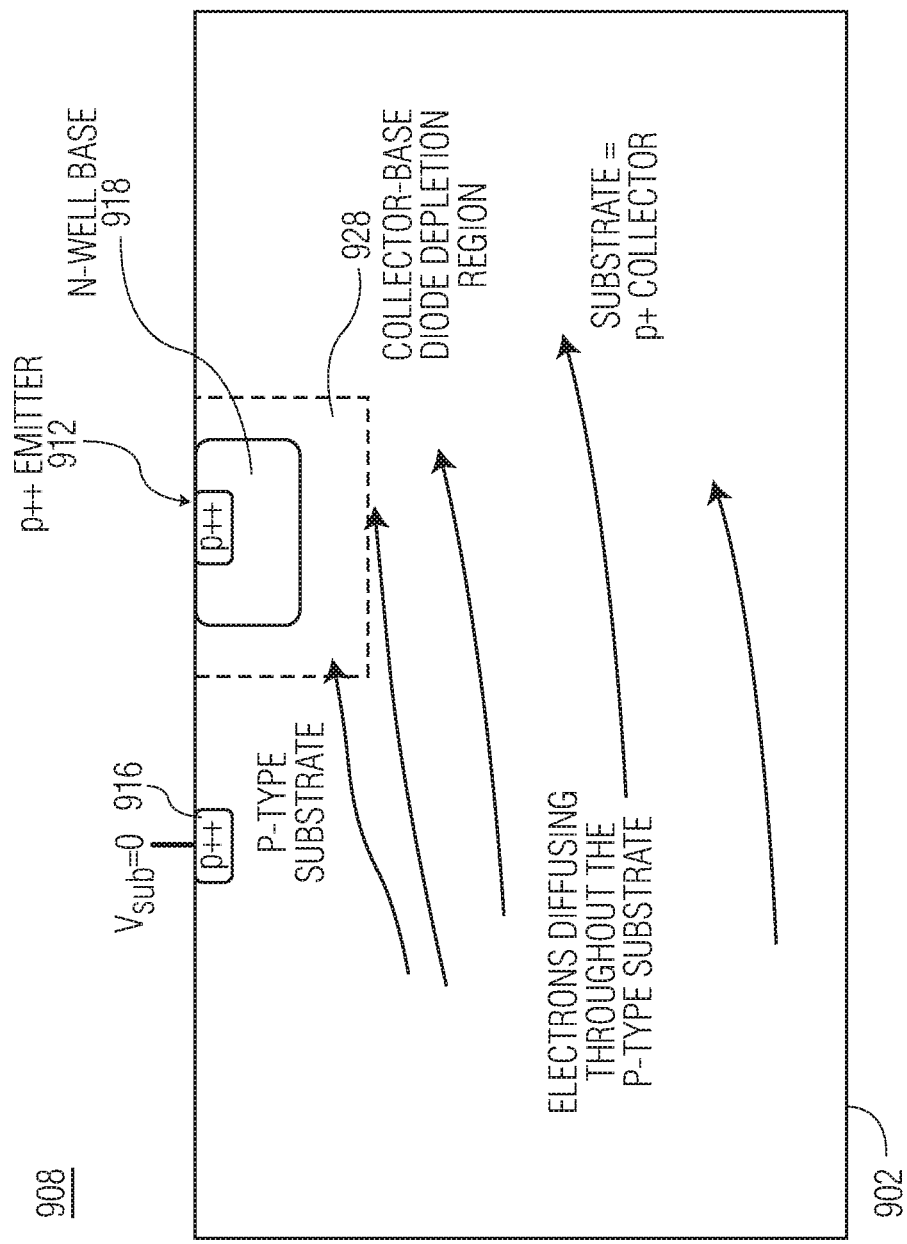
FIG. 9 depicts an embodiment of the charge sensor of the IC system depicted in FIG. 3 that is implemented as a bipolar transistor.

FIG. 9 depicts an embodiment of the charge sensor 308 depicted in FIG. 3 that is implemented as a bipolar transistor. The charge sensor 908 depicted in FIG. 9 is one of the possible embodiments of the charge sensor 308 depicted in FIG. 1. However, the charge sensor 308 depicted in FIG. 3 is not limited to the embodiment shown in FIG. 9.

In the embodiment depicted in FIG. 9, the semiconductor substrate 902 is a p-type substrate and the charge sensor 908 is a PNP bipolar transistor. The PNP bipolar transistor includes a p++ emitter 912 and an n-well base 918. The n-well base of the PNP bipolar transistor is in contact with the semiconductor substrate, forming a collector-base diode depletion region 928. In an example operation of the PNP bipolar transistor, electrons that diffuse into the neighborhood of the n-type base experience a potential, pulling them into the base while the p-type substrate is grounded (the substrate voltage Vsub=0) through a P++ contact region 916. Thus, these electrons contribute to the base current of the PNP bipolar transistor. The base current gives rise to a current between the emitter and the corresponding collector. The output current of the charge sensor is the emitter-collector current, which is an amplified image of the emitter current. The amplified current can make signal interpretation easier. Alternatively, the charge sensor 308 can be implemented as a PNP bipolar transistor, which may include a p++ pad as an emitter and an n-well as a base.

Figure 10:
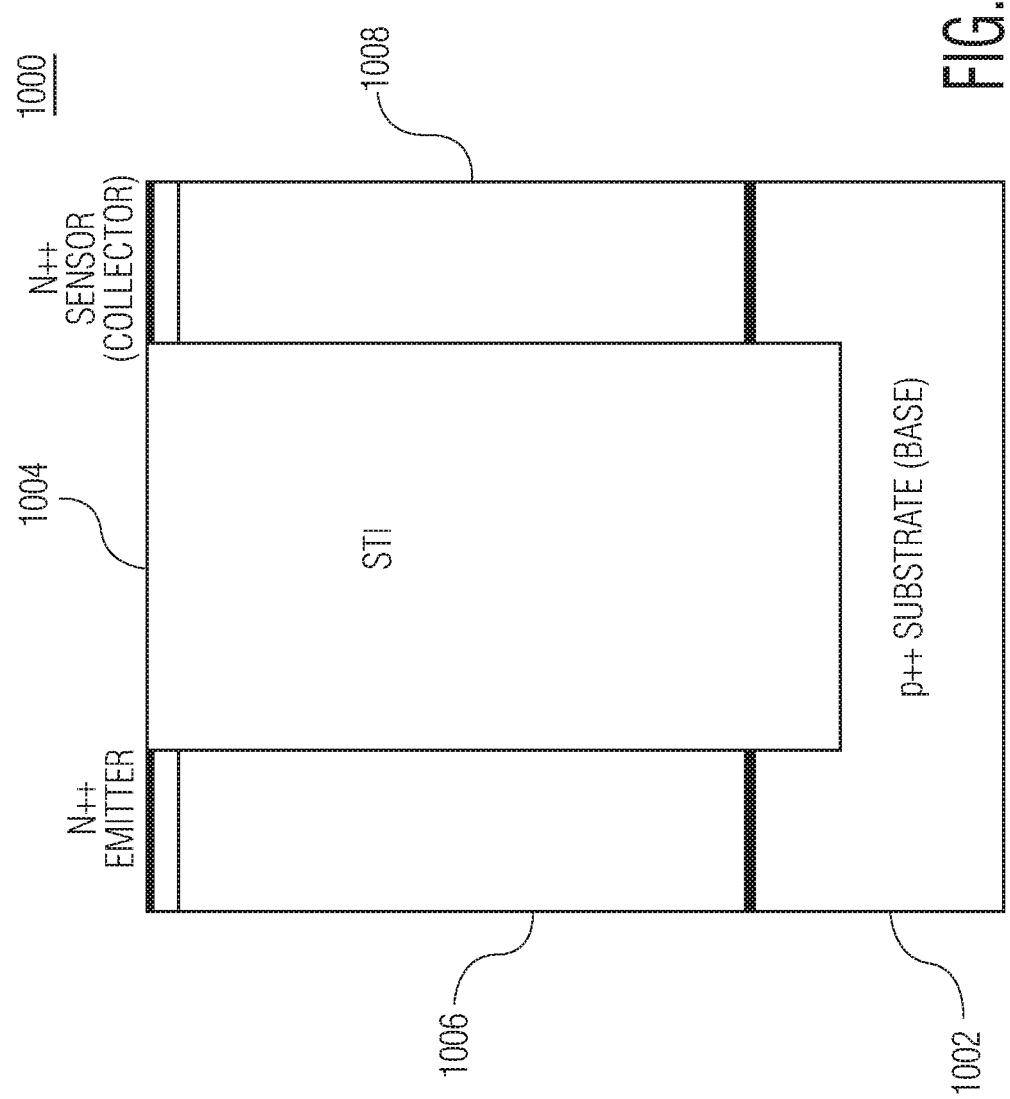
FIG. 10 depicts an embodiment of the IC device depicted in FIG. 1 that is implemented as a bipolar junction transistor.

FIG. 10 depicts a compact embodiment of the IC device 100 depicted in FIG. 1. In the embodiment depicted in FIG. 10, an IC device 1000 is a bipolar junction transistor, which includes an emitter 1006 (serving as a charge emitter), a base 1002 (the p++ substrate), an STI region 1004, and a collector 1008 (serving as a charge sensor). In the embodiment depicted in FIG. 10, the collector current depends on the Gummel number (i.e., the total amount of dope charge in the base). Because the Gummel number directly depends on the substrate thickness, the IC device can detect substrate thickness.

Figure 11:
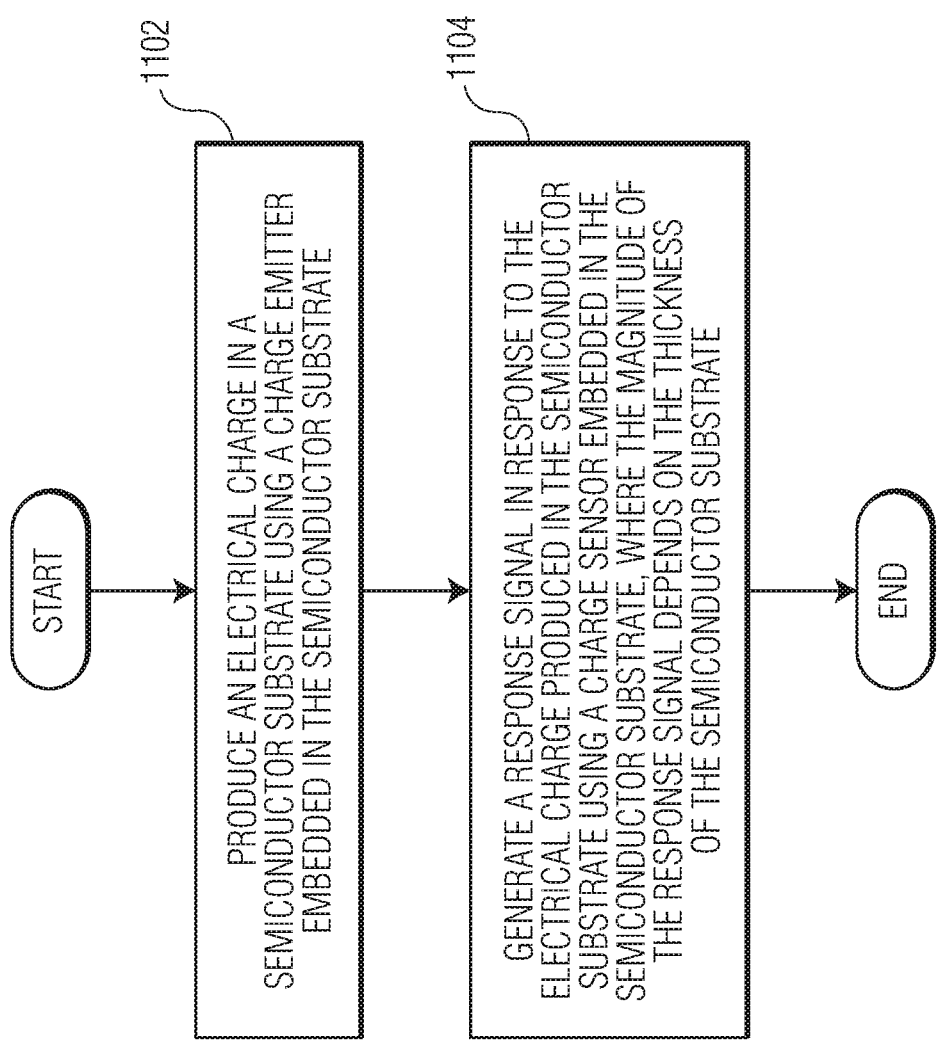
FIG. 11 is a process flow diagram of a method for detecting semiconductor substrate thickness in accordance with an embodiment of the invention.

FIG. 11 is a process flow diagram of a method for detecting semiconductor substrate thickness in accordance with an embodiment of the invention. At block 1102, an electrical charge is produced in a semiconductor substrate using a charge emitter embedded in the semiconductor substrate. At block 1104, a response signal is generated in response to the electrical charge produced in the semiconductor substrate using a charge sensor embedded in the semiconductor substrate. The magnitude of the response signal depends on the thickness of the semiconductor substrate. The charge emitter may be the same or similar to the charge emitter 106 depicted in FIG. 1, the charge emitter 306 depicted in FIG. 3, the charge emitter 406 depicted in FIG. 4A, the charge emitter 456 depicted in FIG. 4B, the charge emitter 506 depicted in FIG. 5A, and/or the charge emitter 556 depicted in FIG. 5B. The charge sensor may be the same or similar to the charge sensor 108 depicted in FIG. 1, the charge sensor 308 depicted in FIG. 3, the charge sensor 708 depicted in FIG. 7A, the charge sensor 758 depicted in FIG. 7B, the charge sensor 808 depicted in FIG. 8A, the charge sensor 858 depicted in FIG. 8B, and/or the charge sensor 908 depicted in FIG. 9.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An Integrated Circuit (IC) device, the IC device comprising:

a semiconductor substrate;
a charge emitter embedded in the semiconductor substrate and configured to produce an electrical charge in the semiconductor substrate;
a charge sensor embedded in the semiconductor substrate and configured to generate a response signal in response to the electrical charge produced in the semiconductor substrate, wherein a magnitude of the response signal depends on a thickness of the semiconductor substrate; and
wherein the charge sensor comprises a diode.

2. The IC device of claim 1, further comprising a response analysis unit configured to generate thickness information of the semiconductor substrate based on the magnitude of the response signal.

3. The IC device of claim 2, wherein the thickness information of the semiconductor substrate comprises information regarding a change in the thickness of the semiconductor substrate.

4. The IC device of claim 1, further comprising a second charge emitter embedded in the semiconductor substrate and configured to produce a second electrical charge in the semiconductor substrate.

5. The IC device of claim 4,
further comprising a second charge sensor embedded in the semiconductor substrate and configured to generate a second response signal in response to the second electrical charge produced in the semiconductor substrate,
wherein the magnitude of the second response signal depends on the thickness of the semiconductor substrate.

6. The IC device of claim 1, wherein the charge emitter comprises a diode.

7. The IC device of claim 1, wherein the charge emitter comprises a bipolar transistor.

8. The IC device of claim 1, wherein the charge sensor comprises a bipolar transistor.

9. The IC device of claim 1, further comprising an emitter controller configured to control a magnitude of electrical charge produced by the charge emitter.

10. The IC device of claim 9,
wherein the emitter controller is further configured to control the charge emitter to produce a second electrical charge in the semiconductor substrate,
wherein the charge sensor generates a second response signal in response to the second electrical charge, and
wherein the IC device further comprises a response analysis unit configured to compare the second response signal to the response signal to determine a change in the thickness of the semiconductor substrate.

11. An Integrated Circuit (IC) system, the IC system comprising:
a semiconductor substrate;
a charge emitter embedded in the semiconductor substrate and configured to produce an electrical charge in the semiconductor substrate;
an emitter controller configured to control a magnitude of electrical charge produced by the charge emitter;
a charge sensor embedded in the semiconductor substrate and configured to generate a response signal in response to the electrical charge produced in the semiconductor substrate,
wherein a magnitude of the response signal depends on a thickness of the semiconductor substrate; and a response analysis unit configured to generate thickness information of the semiconductor substrate based on the response signal
wherein the charge sensor comprises a diode or a bipolar transistor.

12. The IC system of claim 11,
wherein the emitter controller is further configured to control the charge emitter to produce a second electrical charge in the semiconductor substrate,
wherein the charge sensor generates a second response signal in response to the second electrical charge, and
wherein the response analysis unit is configured to compare the second response signal to the response signal to determine a change in the thickness of the semiconductor substrate.

13. The IC system of claim 11, further comprising:
a second charge emitter embedded in the semiconductor substrate and configured to produce a second electrical charge in the semiconductor substrate; and
a second charge sensor embedded in the semiconductor substrate and configured to generate a second response signal in response to the second electrical charge,
wherein the magnitude of the second response signal depends on the thickness of the semiconductor substrate.

14. The IC system of claim 11, wherein the charge emitter comprises a diode or a bipolar transistor.

15. A method for detecting semiconductor substrate thickness, the method comprising:
producing an electrical charge in a semiconductor substrate using a charge emitter embedded in the semiconductor substrate; and
generating a response signal in response to the electrical charge produced in the semiconductor substrate using a charge sensor embedded in the semiconductor substrate,
wherein a magnitude of the response signal depends on a thickness of the semiconductor substrate;
producing a second electrical charge in the semiconductor substrate having the same magnitude as the electrical charge; and
generating a second response signal in response to the second electrical charge;
wherein generating the thickness information of the semiconductor substrate comprises comparing the second response signal to the response signal to determine a change in the thickness of the semiconductor substrate.

16. The method of claim 15, further comprising generating thickness information of the semiconductor substrate based on the response signal.

17. The method of claim 16, wherein the thickness information of the semiconductor substrate comprises information regarding a change in the thickness of the semiconductor substrate.

18. An Integrated Circuit (IC) device, the IC device comprising:
a semiconductor substrate;
a charge emitter embedded in the semiconductor substrate and configured to produce an electrical charge in the semiconductor substrate;
a charge sensor embedded in the semiconductor substrate and configured to generate a response signal in response to the electrical charge produced in the semiconductor substrate, wherein a magnitude of the response signal depends on a thickness of the semiconductor substrate; and
wherein the charge emitter comprises a bipolar transistor.

19. An Integrated Circuit (IC) device, the IC device comprising:
- a semiconductor substrate;
- a charge emitter embedded in the semiconductor substrate and configured to produce an electrical charge in the semiconductor substrate;
- a charge sensor embedded in the semiconductor substrate and configured to generate a response signal in response to the electrical charge produced in the semiconductor substrate, wherein a magnitude of the response signal depends on a thickness of the semiconductor substrate; and
- wherein the charge sensor comprises a bipolar transistor.

* * * * *